(12) United States Patent
Wang et al.

(10) Patent No.: US 8,201,443 B2
(45) Date of Patent: Jun. 19, 2012

(54) SYSTEMS AND METHODS FOR MONITORING CATALYST DEVICE INTEGRITY

(75) Inventors: Zhengming Wang, Fort Wayne, IN (US); Baohua Qi, Columbus, IN (US); David Everard, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 341 days.

(21) Appl. No.: 12/200,378

(22) Filed: Aug. 28, 2008

(65) Prior Publication Data

US 2010/0050758 A1    Mar. 4, 2010

(51) Int. Cl.
*G01M 15/10* (2006.01)

(52) U.S. Cl. .................................... 73/114.75

(58) Field of Classification Search ............... 73/114.69, 73/114.75
See application file for complete search history.

(56) References Cited

U.S. PATENT DOCUMENTS

| | | | | |
|---|---|---|---|---|
| 5,722,236 | A * | 3/1998 | Cullen et al. ..................... | 60/274 |
| 6,192,679 | B1 * | 2/2001 | Nakamura et al. .............. | 60/297 |
| 6,343,466 | B1 * | 2/2002 | Mukaihira et al. .............. | 60/277 |
| 7,263,434 | B2 * | 8/2007 | Ripper et al. .................. | 701/114 |
| 7,424,801 | B2 * | 9/2008 | Mukaihira et al. .............. | 60/277 |
| 7,458,206 | B2 * | 12/2008 | Yahata et al. ................... | 60/297 |

\* cited by examiner

*Primary Examiner* — Eric S McCall (74) *Attorney, Agent, or Firm* — Hamre, Schumann, Mueller & Larson, P.C.

(57) ABSTRACT

Systems and methods for monitoring catalyst presence, reverse and damage in an aftertreatment device. The disclosed systems and methods involve calculating the heat capacity of the catalyst device based on information received from sensors for measuring temperatures at the inlet and outlet of the SCR device and the exhaust mass flow.

24 Claims, 5 Drawing Sheets

Read the sensor readings for exhaust mass flow $f$, the temperature at the inlet of the SCR device $T_{gi}$, the temperature at the outlet of the SCR device $T_{go}$, the known values for the weighted thermal conductivity $\lambda$, the surface area of the SCR device $S$ and the weighted thickness $d$    64

Estimate the bed temperature $T_b$ from the temperatures at the inlet $T_{gi}$ and the outlet $T_{go}$ of the SCR device    65

Calculate the heat exchange loss    66

Calculate the heat capacity for the catalyst device    67

Compare the heat capacity and heat exchange loss with predetermined thresholds    68

Trigger a SCR catalyst fault if the heat capacity and heat exchange loss are out of range    69

SYSTEMS AND METHODS FOR MONITORING CATALYST DEVICE INTEGRITY

FIELD

This disclosure relates generally to systems and methods for monitoring a device, and more particularly to control systems and methods for monitoring the integrity of an aftertreatment device.

BACKGROUND

In certain countries, environmental laws require that exhaust emission reduction equipment such as aftertreatment devices be continuously monitored by on-board diagnostic (OBD) systems.

Aftertreatment devices are well known and widely used in various internal combustion engine applications for the aftertreatment of engine exhaust gases. Devices such as selective catalytic reduction (SCR) catalyst devices have been useful for handling and/or removing nitric oxide in the exhaust stream of an engine.

The SCR catalyst devices typically utilize a catalytic reducing agent. The exhaust gas reacts with a reagent solution on the SCR catalyst device so as to reduce the nitric oxide content in the exhaust gas stream.

In some OBD methods involving the monitor of a SCR catalyst device, kinetics of temperature changing across the catalyst are measured to detect catalyst device absence, reverse and damage. However, such methods take exhaust mass flow, which significantly affects temperature of the changing kinetics, as an uncertainty. As a result, a tradeoff between high false alarm rates and high false passing exists.

In other known OBD methods, exhaust temperatures at engine cold start are used as a base line. These methods however can only be applied after the engine is cooled to ambient temperature.

Thus, there is a need to provide an improved OBD method that can monitor catalyst device integrity more accurately and is not limited by the status of the engine.

SUMMARY

Methods and system for monitoring the integrity of an aftertreatment device, and in particular, a selective catalyst reduction (SCR) device which includes a SCR catalyst. While the methods described herein have particular use in systems that emit exhaust emissions generated by an engine, the methods can be employed in other systems that utilize catalyst chambers. Moreover, the type of exhaust emissions treated is not particularly limited, and may be diesel engine gas, etc.

The disclosed method and system generally involve measuring the heat capacity of the SCR device. The heat capacity is a basic property of a catalyst device, and can be used in detecting more accurately catalyst device presence, reverse and damage as compared to conventional methods without the requirement of the temperature of the engine and catalyst device to be at ambient temperature.

In one embodiment, the disclosed system includes an aftertreatment device. In one example, the aftertreatment device is a SCR device. The SCR device includes a SCR catalyst within a shell, and is configured to reduce the level of nitric oxide in the exhaust gas entering the SCR device so as to maintain the nitric oxide level in the exhaust gas leaving the SCR device at or below a threshold amount.

The disclosed system further includes a first sensor for measuring the inlet temperature of the SCR device, a second sensor for measuring the outlet temperature of the SCR device and an optional third sensor for measuring the exhaust mass flow, which can also be estimated in an engine control unit. The disclosed system also includes a control unit that is configured to execute the disclosed method. The control unit has an input for receiving information from the sensors and an output for communicating the received information to a processor. The control unit also has a memory for storing a software algorithm that implements the disclosed method.

The disclosed method generally involves calculating the heat capacity of the catalyst device or the heat exchanging rate between the catalyst device and ambient based on readings from the first and second temperature sensors and exhaust flow value obtained through the third mass flow sensor or provided by the engine control unit and comparing the calculated heat capacity value or heat exchanging rate value of the catalyst device with predetermined thresholds. If the heat capacity value or the heat exchanging rate value is out of range, then a fault signal is generated.

In one embodiment, the exhaust mass flow, the gas temperature at the inlet of the SCR device and the gas temperature at the outlet of the SCR device are measured. From these measurements, the bed temperature of the SCR device is estimated. The resulting estimate is then used to calculate the heat capacity for the SCR device.

DETAILED DESCRIPTION

Systems and methods for monitoring aftertreatment device presence, severe leak, and reverse are described. The disclosed methods and systems involve calculating the heat capacity of the catalyst device based on information received from sensors for measuring inlet and outlet temperatures of the SCR device and the exhaust mass flow. The calculated heat capacity can be advantageously employed in a control module for monitoring the state of the catalyst device while the engine is running without requiring any special conditions.

Figure 1:
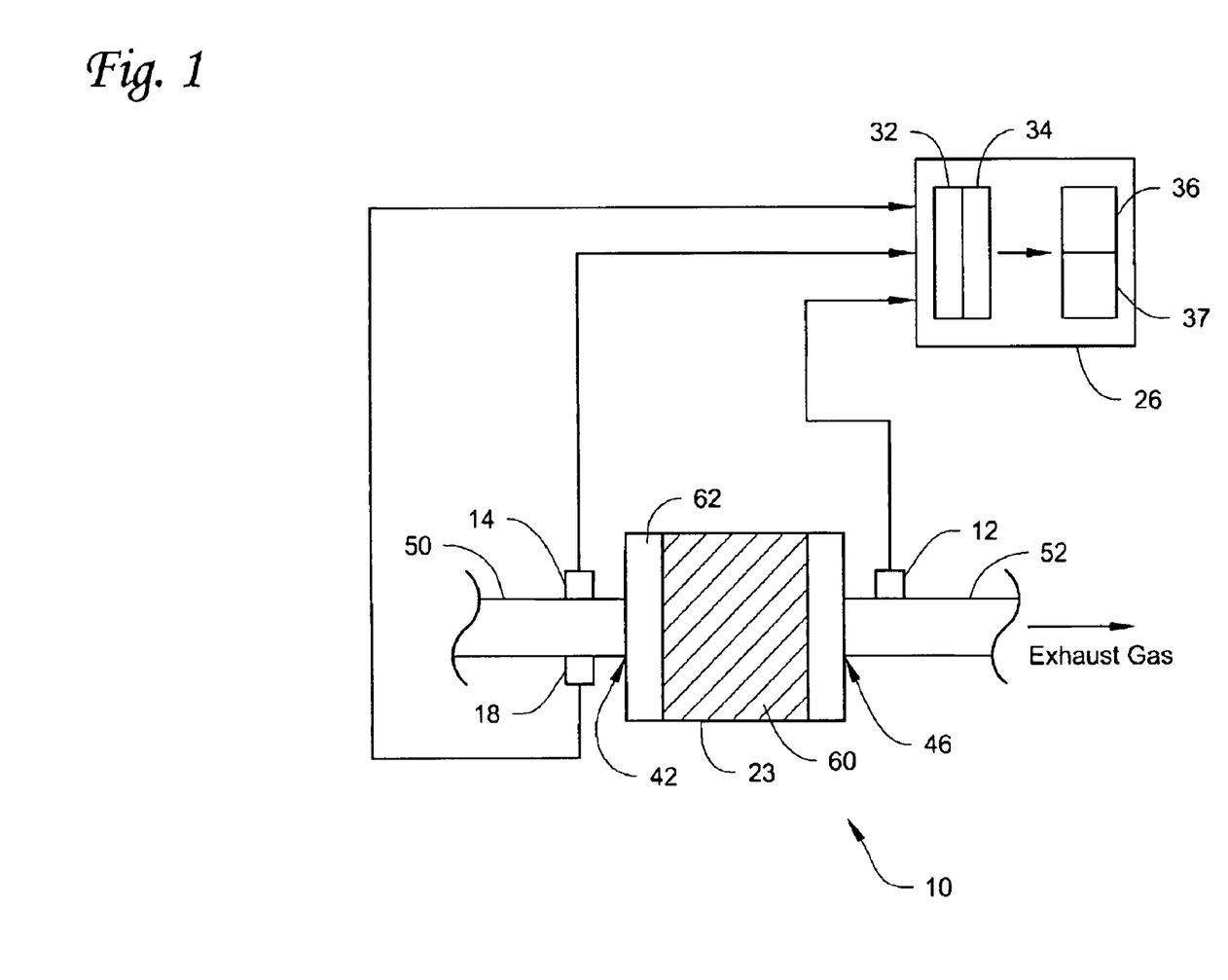
FIG. 1 is a schematic representation of one embodiment of the disclosed system including an embodiment of an SCR catalyst.

FIG. 1 shows one embodiment of the disclosed system. The system 10 includes an SCR device 23 having an inlet 42 and an outlet 46. An exhaust pipe 50 is fluidly coupled to the inlet 42 of the SCR device 23, and an exhaust pipe 52 is fluidly coupled to the outlet 46 of the SCR device 23. The SCR device 23 includes a SCR catalyst 60 within a shell 62.

In this embodiment, exhaust gas produced by an engine (not shown) is directed through the exhaust pipe 50 to the inlet 42 of the SCR device 23, through the SCR device 23 and then through the outlet 46 of the SCR device 23 and expelled via the exhaust pipe 52.

The system 10 further includes an inlet exhaust gas temperature sensor 14 and an optional exhaust mass flow sensor 18 mounted on the exhaust pipe 50 for measuring the exhaust gas temperature at the inlet 42 of the SCR device 23 and exhaust mass flow, respectively. The system 10 also includes an outlet exhaust gas temperature sensor 12 mounted on the exhaust pipe 52 for measuring the exhaust gas temperature at the outlet 46 of the SCR device 23. The sensors 12, 14, 18 are connected to a control module 26, which is configured to receive information from the sensors 12, 14, 18, and implement the disclosed method.

In one example, the control module 26 includes an input port 32 for receiving sensory information and an output port 34 for outputting the received sensory information to a processor 36 and a storage unit 37, where the disclosed method is carried out by the control module 26. FIG. 1 shows the input and output ports 32, 34, the processor 36 and the storage unit 37 within a single control module 26. However, in appropriate circumstances, the components of the module may be placed in separate modules, and have other configurations than that described herein.

The computational approach for the disclosed method involves calculating the heat capacity of the SCR catalyst device according to the sensor readings of the temperature sensors 12 and 14, and exhaust mass flow obtained through an optional sensor 18 or estimated in the engine control unit.

With these values, an exhaust gas enthalpy change across the SCR device can be determined according to equation (1), $$E_g = \int_0^t f C_p (T_{gi} - T_{go}) dt \quad (1)$$

where $E_g$ is the exhaust gas enthalpy change across the catalyst device, f the exhaust mass flow, $C_p$ the specific heat of the exhaust gas, $T_{gi}$ the exhaust gas temperature at the inlet of the SCR device, $T_{go}$ the exhaust gas temperature at the outlet of the SCR device, and t is the time.

The calculated value for the exhaust gas enthalpy change across the SCR device obtained from equation (1) can then be used to calculate the heat capacity of the catalyst device according to equations (2), (3) and (4), $$E_g = E_{ex} + E_c \quad (2)$$

$$E_{ex} = \int_0^t C_c M_c \hat{T}_b dt \quad (3)$$

$$E_c = \int_0^t (\lambda S/d)(T_b - T_a) dt \quad (4)$$

where $E_{ex}$ is the heat energy transferred to the catalyst substrate, $E_c$ the heat energy loss to ambient by conduction processes, $T_b$ the bed temperature of the SCR device, $T_a$ the ambient temperature, $\lambda$ the weighted thermal conductivity, S the catalyst device surface area, d the weighted thickness, $C_c$ the heat capacity of the catalyst device, and $M_c$ is the mass of the catalyst device.

In particular, the heat capacity of the catalyst device can be calculated by equating the calculated exhaust gas enthalpy change across the catalyst device from equation (1) with heat energy transferred to the catalyst device and the heat energy loss to ambient according to equation (2).

Without being bound to theory, the principles of the computational approach are explained as follows: generally, the heat capacity of a catalyst device keeps within a range determined by the mass of the device and the materials used in the device. When the catalyst device is absent, damaged, reversed or replaced with other materials, heat capacity will change. When heat capacity change above the normal range is detected, a fault will be triggered.

Moreover, in a properly functioning catalyst device, the work done by the exhaust gas expansion is significantly smaller than the heat process and the heat energy transferred between exhaust air flow and the bed of the catalyst device (heat exchange) is significantly larger than the heat generated or absorbed and desorbed by the catalyst device in the chemical reaction and the heat energy loss to ambient (conduction process).

The above principles can be applied in the disclosed method by substituting the calculated value of the exhaust gas enthalpy change across the catalyst device from equation (1) into equation (2), and calculating heat exchange energy according equation (4). The heat capacity of the catalyst device is then calculated according to equations (2), (3) and (4). The calculated heat exchange energy and heat capacity values are then compared with theoretical values to determine whether the catalyst device is present, damaged or reversed.

Figure 2:
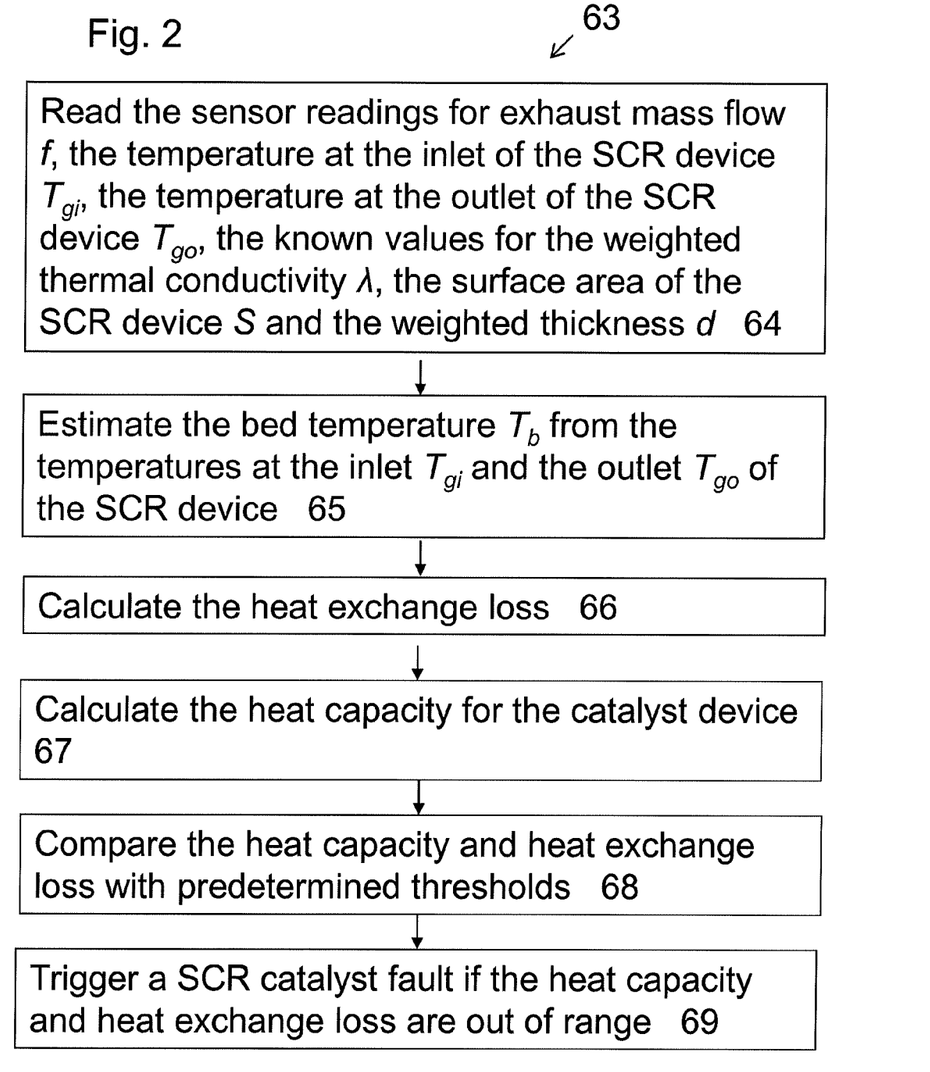
FIG. 2 is a flow diagram of one embodiment of the disclosed method.

FIG. 2 shows steps that are generally involved in one embodiment of the disclosed method. The method 63 includes reading the sensor readings for exhaust mass flow f, the temperature at the inlet of the SCR device $T_{gi}$ and the temperature at the outlet of the SCR device $T_{go}$, and the known values for the weighted thermal conductivity $\lambda$, the surface area of the SCR device S and the weighted thickness d 64. The method 63 further includes estimating the bed temperature $T_b$ from the temperatures at the inlet $T_{gi}$ and the outlet $T_{go}$ of the SCR device 65, calculating the heat exchange loss 66, calculating the heat capacity for the catalyst device 67, comparing the heat capacity and heat exchange loss with predetermined thresholds 68 and triggering a SCR catalyst fault if the heat capacity and heat exchange loss are out of range 69.

Figure 3:
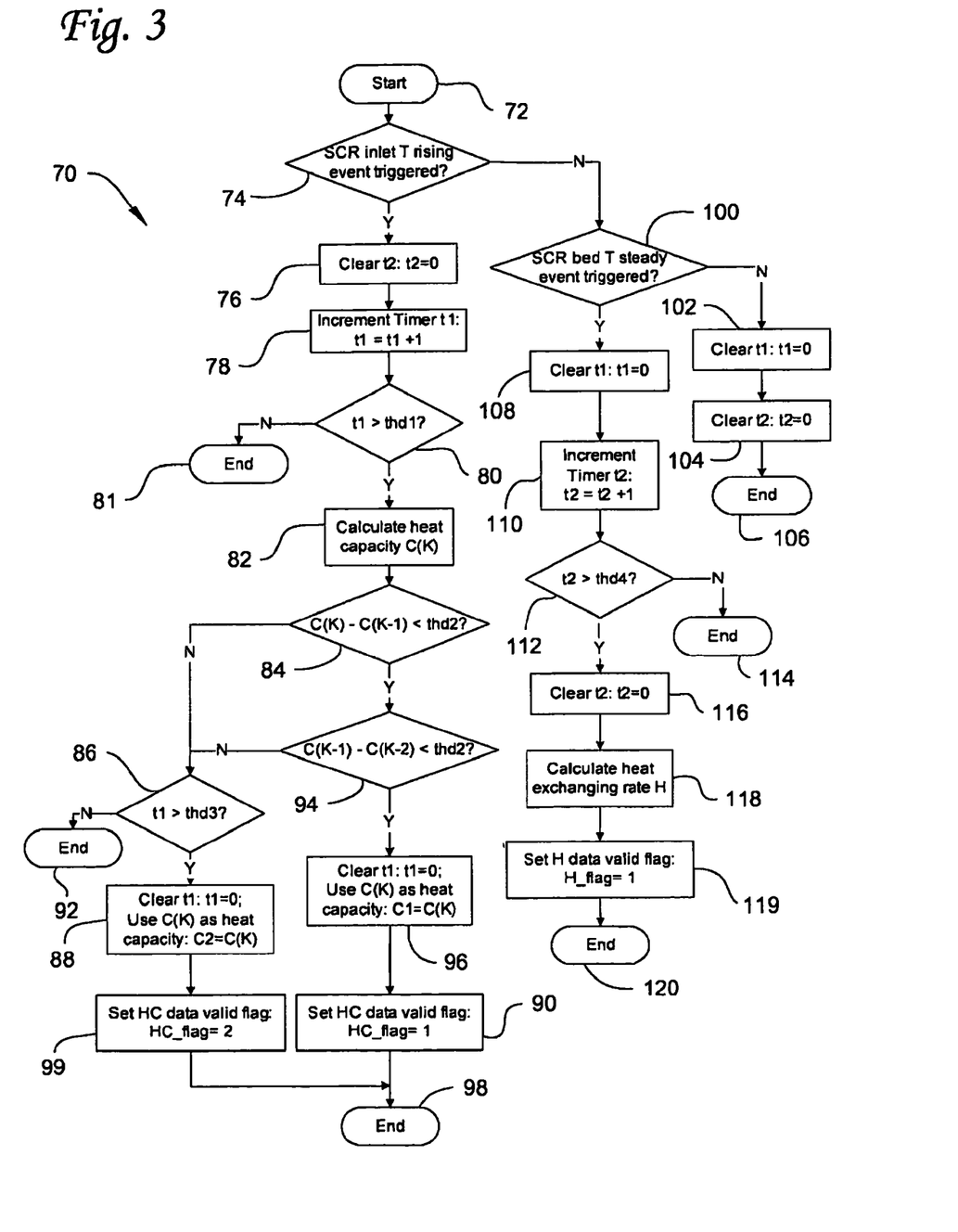
FIG. 3 is a flow diagram of one implementation of the disclosed method illustrated in FIG. 2 for calculating the heat capacity of the catalyst device.
Figure 4A:
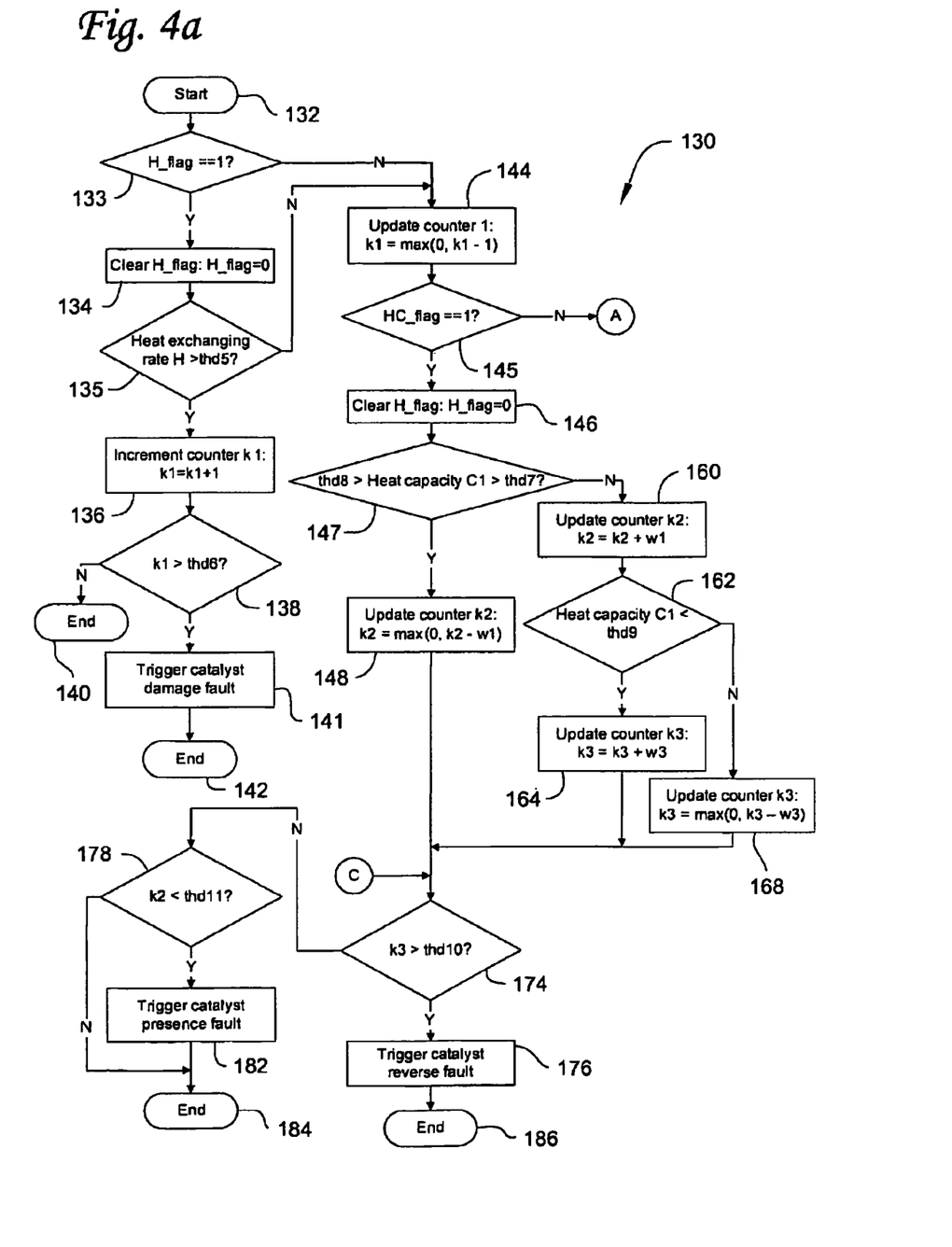
FIGS. 4a and 4b are flow diagrams of one implementation of the disclosed method illustrated in FIG. 2 for generating SCR catalyst fault.
Figure 4B:
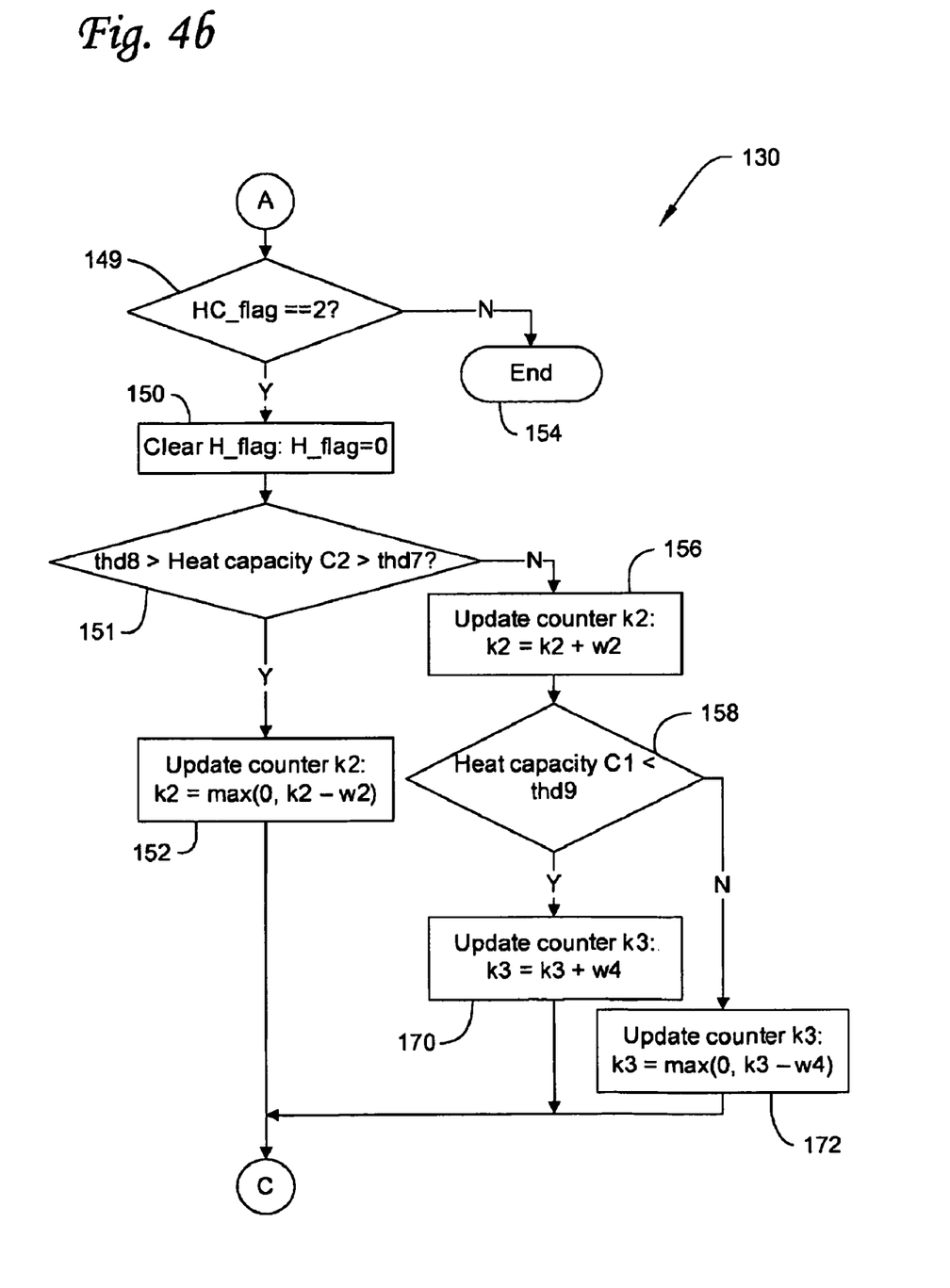

One implementation of the disclosed method is described with reference to FIGS. 3, 4a and 4b. FIGS. 3, 4a and 4b are flowcharts of software algorithms for monitoring the catalyst device using the system 10 of FIG. 1. The algorithms are stored in the storage unit 37 of the control module 26 and executed by the processor 36.

FIG. 3 illustrates a flow chart of a computational algorithm 70 for determining the heat capacity of the catalyst device. The algorithm 70 can be realized in an interrupt service routine, which begins at step 72, where the control module 26 is operable to set an iteration counter value K.

At step 74, sensor readings from the inlet exhaust gas temperature sensor 14 are read at predetermined time intervals and a determination is made as to whether the temperature of the inlet 42 of the SCR device 23 is rising. If the temperature of the inlet 42 of the SCR device 23 is rising, the time counter t2 is cleared to zero in step 76. Thereafter at step 78, the time counter t1 is incremented by 1.

Next, at step 80, the time counter t1 is compared with a predetermined threshold thd1. If the value of the time counter t1 is above the predetermined threshold thd1, then at step 82, the heat capacity of the catalyst device for current iteration K is computed as described above. If the value of the time counter t1 is below the predetermined threshold thd1, the heat capacity of the catalyst device is not calculated, and the algorithm 70 reaches an end 81.

Once the heat capacity of the catalyst device for the current iteration K is calculated, at step 84, the value of the difference between the heat capacity of the catalyst device for the current iteration K and the heat capacity of the catalyst device for previous iteration K−1 is compared with a predetermined threshold thd2.

If this value is above the predetermined threshold thd2, then at step 86, the value of the time counter t1 is compared with a predetermined threshold thd3. If the value of the time counter t1 is above the predetermined threshold thd3, then at step 88, the time counter t1 is cleared to zero, and the calculated heat capacity for the current iteration K is used as heat capacity value C2. After setting a data validity flag HC_flag to 2 at step 99, the algorithm 70 then reaches an end 98. If the value of the time counter t1 is not above the predetermined threshold thd3, the algorithm 70 reaches an end 92.

Referring back to step 84, if the value of the difference between the heat capacity of the catalyst device for the current iteration K and the heat capacity of the catalyst device for the previous iteration K−1 is below the predetermined threshold thd2, then the algorithm 70 proceeds to step 94.

At step 94, the value of the difference between the heat capacity of the catalyst device for the previous iteration K−1 and the heat capacity of the catalyst device for previous iteration K−2 is compared with the predetermined threshold thd2.

If this value is above the predetermined threshold thd2, then the sequence advances to step 86. If the value in step 94 is lower than the predetermined threshold thd2, then at step 96, the time counter t1 is cleared to zero, and the calculated heat capacity for the current iteration K is used as heat capacity C1. After setting the data validity flat HC_flag to 1 at step 90, the algorithm 70 then reaches an end 98.

Referring back to step 74, if the bed temperature of the SCR device is determined not to be rising, then at step 100, a determination is made as to whether the temperature at the SCR inlet is steady.

If the temperature at the SCR inlet is not steady, then the time counter t1 is cleared to zero at step 102, and the time counter t2 is cleared to zero at step 104. The algorithm 70 then reaches an end 106.

If the temperature at the SCR inlet is steady, then the time counter t1 is cleared to zero at step 108, and at step 110, the time counter t2 is incremented by 1.

Next, the value of the time counter t2 is compared with a predetermined threshold thd4 at step 112. If the value of the time counter t2 is less than or equal to the predetermined threshold thd4, then the algorithm 70 reaches an end 114. Otherwise, the time counter t2 is cleared to zero at step 116, and at step 118, the heat exchanging rate value H is calculated using equation (3). The algorithm 70 then sets a data validity flag H_flag to 1 at step 119, and reaches an end 120.

The computed heat capacity values C1, C2, the heat exchanging rate value H, and the data validity flags HC_flag, H_flag are stored in buffers (not shown) and read in an algorithm 130 for generating SCR catalyst fault. The values in counters t1 and t2 are saved for calculations in subsequent steps.

FIGS. 4a and 4b illustrate a flow chart of the algorithm 130 for generating SCR catalyst fault. Similarly to the algorithm 70, the algorithm 130 can also be realized in an interrupt service routine that begins at step 132.

At step 133, the data validity flag H_flag is examined. If the value of the data validity flag H_flag is 1, then at the following step 134, the value of the data validity flag H_flag is reset to 0. The heat exchanging rate value H is thereafter read from the buffers, and the value of the heat exchanging rate value H is compared with a predetermined threshold thd5 at step 135.

If the heat exchanging rate value H is greater than the predetermined threshold thd5, then the counter k1 is incremented by 1 in step 136. Then at step 138, the value of the counter k1 is compared with a predetermined threshold thd6.

If the value of the counter k1 is lower than or equal to the predetermined threshold thd6, then the algorithm 130 reaches an end 140. Otherwise, a catalyst damage fault is triggered at step 141. The algorithm 130 then reaches an end 142.

Referring back to steps 133 and 135, if the value of the data validity flag H_flag is not 1, or the heat exchanging rate value H is less than or equal to the predetermined threshold thd5, then the counter k1 is decremented by 1 but no less than zero in step 144. Then in step 145, the data validity flag H_flag is examined. Upon the value of the data validity flag H_flag reaching 1, the value of the data validity flag H_flag is reset to 0 at step 146, and the heat capacity value C1 is read from the buffer, and compared with predetermined thresholds thd7 and thd8 at step 147.

If the heat capacity value C1 is greater than the predetermined threshold thd7 but less than the predetermined threshold thd8, then at step 148, the counter k2 is decremented by w1, but no less than zero.

Referring back to step 147, if the heat capacity value C1 is less than or equal to the predetermined threshold thd7 or greater than or equal to the predetermined threshold thd8, then the counter k2 is incremented by w1 at step 160. Then, the heat capacity value C1 is compared with a predetermined threshold thd9 at step 162.

If the heat capacity value C1 is less than the predetermined threshold thd9, then at step 164, the counter k3 is incremented by w3, and the algorithm 130 proceeds to step 174. On the other hand, if the value of the heat capacity C1 is greater than or equal to the predetermined threshold thd9, then at step 168, the counter k3 is decremented by w3, but no less than zero. The algorithm 130 then proceeds to step 174.

Referring back to step 145, if the value of the data validity flag HC_flag is not 1, then the algorithm 130 proceeds to step 149 (shown in FIG. 4b), at which a determination is made if the data validity flag HC_flag value is equal to 2. If the data validity flag HC_flag value is not equal to 2, then the algorithm 130 reaches an end 154. Upon the data validity flag HC_flag reaching a value of 2, the data validity flag HC_flag value is reset to 0 in step 150, and the heat capacity value C2 is read from the buffer, and compared with predetermined thresholds thd7 and thd8 at step 151.

If the heat capacity value C2 is greater than the predetermined threshold thd7 but less than the predetermined threshold thd8, then at step 152, the counter k2 is decremented by w2, but no less than zero.

Referring back to step 151, if the heat capacity value C2 is less than or equal to the predetermined threshold thd7 or greater than or equal to the predetermined threshold thd8, then the counter k2 is incremented by w2 at step 156. Then, the heat capacity value C1 is compared with a predetermined threshold thd9 at step 158.

If the heat capacity value C1 is less than the predetermined threshold thd9, then at step 170, the counter k3 is incremented by w4, and the algorithm 130 proceeds to step 174 (shown in FIG. 4a). On the other hand, if the value of the heat capacity C1 is greater than or equal to the predetermined threshold thd9, then at step 172, the counter k3 is decremented by w4, but no less than zero. The algorithm 130 then proceeds to step 174.

At step 174, the value of the counter k3 is compared with a predetermined threshold thd10. If the value of the counter k3 is less than or equal to the predetermined threshold thd10, the algorithm 130 proceeds to step 178. If the value of the counter k3 is greater than the predetermined threshold thd10, then a catalyst reverse fault is triggered at step 176. The algorithm 130 then reaches to an end 186.

At step 178, the value of the counter k2 is compared with a predetermined threshold thd11. If the value of the counter k2 is less than or equal to the predetermined threshold thd10, then the algorithm 130 reaches an end 184. On the other hand, if the value of the counter k2 is greater than the predetermined threshold thd11, a catalyst presence fault is triggered at step 182, and then the algorithm 130 reaches an end 184.

While the disclosed system and method have been described in conjunction with a preferred embodiment, it will be obvious to one skilled in the art that other objects and refinements of the disclosed system and method may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:

1. A method of monitoring the performance of an exhaust emissions aftertreatment device in a system that includes a combustion engine and the aftertreatment device, comprising:

determining at least one or more of a heat capacity value of the aftertreatment device and a heat exchanging rate value of the aftertreatment device, wherein the at least one or more of the heat capacity value and the heat exchanging rate value is determined while the combustion engine produces exhaust gas after combustion of fuel and feeds the exhaust gas into the aftertreatment device; and comparing at least one or more of the determined heat capacity value with a heat capacity predefined threshold value and the determined heat exchanging rate value with a heat exchanging rate predefined threshold value, to determine the status of the aftertreatment device, wherein the aftertreatment device includes a catalyst.

2. The method of claim 1, wherein a fault is logged when the heat exchanging rate value is greater than the heat exchanging rate predefined threshold value.

3. The method of claim 1, wherein a fault is logged when the heat capacity value is less than a first heat capacity predefined threshold value or greater than a second heat capacity predefined threshold value.

4. The method of claim 1, wherein the exhaust emissions is diesel engine exhaust.

5. The method of claim 1, wherein determining the heat capacity value of the aftertreatment device further comprises defining a start time by monitoring the temperature of the aftertreatment device over a time period to determine if the temperature at an inlet is changing;

defining a stop time after the step of monitoring the temperature of the aftertreatment device;

determining if the stop time meets a predefined criteria; and generating the heat capacity value of the aftertreatment device.

6. The method of claim 5, wherein generating the heat capacity of the aftertreatment device comprises calculating at least one iteration value of a heat capacity of the aftertreatment device using the provided values for (1) the temperature at the inlet of the aftertreatment device, (2) the temperature at an outlet of the aftertreatment device, and (3) exhaust mass flow of the aftertreatment device; and assigning the at least one iteration value to the heat capacity value.

7. The method of claim 6, wherein calculating the at least one iteration value comprises calculating first, second and third iteration values, and assigning the at least one iteration value comprises comparing a difference between the first and second iteration values with a first predetermined threshold value.

8. The method of claim 7, wherein assigning the at least one iteration value further comprises comparing the stop time with a second predetermined threshold value when the difference between the first and second iteration values is greater than the first predetermined threshold value, and the difference between the second and third iteration values is greater than the first predetermined threshold value, and assigning the first iteration value to a first heat capacity value when the stop time is greater than the second predetermined threshold value.

9. The method of claim 8, wherein assigning the at least one iteration value further comprises comparing a difference between the second and third iteration values with a third predetermined threshold value when the difference between the first and second iteration values is less than or equal to the first predetermined threshold value, and assigning the first iteration value to a second heat capacity value when the difference between the second and third iteration values is less than or equal to the third predetermined threshold value.

10. The method of claim 9, wherein a fault is logged when the first or second heat capacity values do not meet at least one predetermined criteria.

11. The method of claim 1, wherein determining the heat exchanging rate value of the device comprises providing values for (1) a temperature at an inlet of the aftertreatment device, (2) a temperature at an outlet of the aftertreatment device, and (3) an exhaust mass flow of the aftertreatment device.

12. The method of claim 11, wherein determining the heat exchanging rate value of the aftertreatment device further comprises defining a start time by monitoring the temperature at the inlet of the aftertreatment device over a time period to determine if the temperature at the inlet is steady, defining a stop time after the step of determining if the temperature at the inlet is steady;

determining if the stop time meets a predefined criteria, and calculating the heat exchanging rate value of the aftertreatment device.

13. A method of monitoring catalyst device integrity in a selective catalytic reduction catalyst device in a system that includes a combustion engine and the catalyst device, comprising:

calculating a heat capacity of the catalyst device while the combustion engine is producing exhaust emissions after combustion of fuel and feeding the exhaust emissions into the catalyst device; and determining presence, damage or reverse of the catalyst device by comparing the calculated heat capacity with a heat capacity predefined threshold value, wherein the catalyst device is configured for treating the exhaust emissions from the combustion engine.

14. The method of claim 13, wherein the exhaust emissions is diesel engine exhaust.

15. A system for monitoring aftertreatment device integrity, comprising:

an exhaust aftertreatment device having an inlet and an outlet and configured to convert a first exhaust emissions to a second mixture of exhaust emissions;

a selective catalytic reduction catalyst within the exhaust aftertreatment device;

a first sensor for measuring a temperature at the inlet of the exhaust aftertreatment device;

a second sensor for measuring a temperature at the outlet of the exhaust aftertreatment device;

a third sensor for measuring an exhaust mass flow of the exhaust aftertreatment device;

a control module configured to receive information from the first, second and third sensors;

wherein the control module calculates a heat capacity of the aftertreatment device and a heat exchanging rate of the aftertreatment device using information provided by the first, second and third sensors.

16. The system of claim 15, wherein the third sensor is a virtual sensor, the value of which is estimated in an engine control unit.

17. The system of claim 15, wherein the control module further compares the heat capacity or the heat exchanging rate with at least one predefined value, and a fault is logged when predetermined criteria are not met.

18. A method of monitoring the performance of an exhaust emissions aftertreatment device that includes a catalyst, comprising:

determining at least one or more of a heat capacity value of the aftertreatment device and a heat exchanging rate value of the aftertreatment device; and comparing at least one or more of the heat capacity value with a heat capacity predefined threshold value and the heat exchanging rate value with a heat exchanging rate predefined threshold value, to determine the status of the aftertreatment device, wherein determining the heat capacity value of the aftertreatment device comprises providing values for (1) a temperature at an inlet of the aftertreatment device, (2) a temperature at an outlet of the aftertreatment device, and (3) an exhaust mass flow of the aftertreatment device.

19. The method of claim 18, wherein determining the heat capacity value of the aftertreatment device further comprises defining a start time by monitoring the temperature of the aftertreatment device over a time period to determine if the temperature at an inlet is changing;

defining a stop time after the step of monitoring the temperature of the aftertreatment device;

determining if the stop time meets a predefined criteria; and generating the heat capacity value of the aftertreatment device.

20. The method of claim 19, wherein generating the heat capacity of the aftertreatment device comprises calculating at least one iteration value of a heat capacity of the aftertreatment device using the provided values for (1) the temperature at the inlet of the aftertreatment device, (2) the temperature at an outlet of the aftertreatment device, and (3) exhaust mass flow of the aftertreatment device; and assigning the at least one iteration value to the heat capacity value.

21. The method of claim 20, wherein calculating the at least one iteration value comprises calculating first, second and third iteration values, and assigning the at least one iteration value comprises comparing a difference between the first and second iteration values with a first predetermined threshold value.

22. The method of claim 21, wherein assigning the at least one iteration value further comprises comparing the stop time with a second predetermined threshold value when the difference between the first and second iteration values is greater than the first predetermined threshold value, and the difference between the second and third iteration values is greater than the first predetermined threshold value, and assigning the first iteration value to a first heat capacity value when the stop time is greater than the second predetermined threshold value.

23. The method of claim 22, wherein assigning the at least one iteration value further comprises comparing a difference between the second and third iteration values with a third predetermined threshold value when the difference between the first and second iteration values is less than or equal to the first predetermined threshold value, and assigning the first iteration value to a second heat capacity value when the difference between the second and third iteration values is less than or equal to the third predetermined threshold value.

24. The method of claim 23, wherein a fault is logged when the first or second heat capacity values do not meet at least one predetermined criteria.

* * * * *